(12) United States Patent
Sasamoto et al.

(10) Patent No.: US 6,898,578 B2
(45) Date of Patent: *May 24, 2005

(54) RECORDING APPARATUS FOR RECORDING DIGITAL INFORMATION

(75) Inventors: Manabu Sasamoto, Yokohama (JP);
Takaharu Noguchi, Yokohama (JP);
Makoto Aikawa, Yokohama (JP);
Shigeru Hirahata, Ooiso-machi (JP)

(73) Assignee: Hitachi, Ltd., Tokyo (JP)

( * ) Notice: Subject to any disclaimer, the term of this patent is extended or adjusted under 35 U.S.C. 154(b) by 357 days.

This patent is subject to a terminal disclaimer.

(21) Appl. No.: 10/210,107

(22) Filed: Aug. 2, 2002

(65) Prior Publication Data

US 2003/0110134 A1 Jun. 12, 2003

Related U.S. Application Data

(63) Continuation of application No. 09/201,757, filed on Dec. 1, 1998, now Pat. No. 6,453,304.

(30) Foreign Application Priority Data

Dec. 15, 1997 (JP) .......................................... P09-344632

(51) Int. Cl.[7] ........................... H04L 9/00; G06F 17/60; H04K 1/00
(52) U.S. Cl. ............................. 705/57; 705/51; 705/58; 380/201; 380/203
(58) Field of Search ............................. 705/51, 57, 58; 380/201, 203

(56) References Cited

U.S. PATENT DOCUMENTS 4,525,599 A * 6/1985 Curran et al. ............... 713/190
5,073,925 A * 12/1991 Nagata et al. ................ 360/60
5,627,655 A * 5/1997 Okamoto et al. ............. 386/94

(Continued)

FOREIGN PATENT DOCUMENTS

| EP | 0 802 535 A1 | * 10/1997 |
| EP | 0 814 474 A1 | * 12/1997 |
| JP | 02-7269 A | * 1/1990 |
| JP | 02-007269 A | 1/1990 |
| WO | WO 96/18951 | 6/1996 |
| WO | WO-9618951 A1 | * 6/1996 |

OTHER PUBLICATIONS

Dunn, D., "ST Produces DVD Encoder Chip," Electronic Buyers News, p. 3, Sep. 16, 1996.*

Dunn, "ST Produces DVD Encoder Chip," *Electronic Buyers News*, p. 3, Sep. 16, 1996.

Fujita et al., "Newly Developed D–VHS Digital Tape Recording System for the Era," pp. 617–622, vol. 42, No. 3, Aug. 1996.

*Primary Examiner*—Nicholas D. Rosen
(74) *Attorney, Agent, or Firm*—Antonelli, Terry, Stout & Kraus, LLP

(57) ABSTRACT

A digital information recording apparatus to record digital information to protect copyright of digital information that includes at least first digital information and first copy control information. The digital information recording apparatus records the digital information based upon the first copy control information, which denotes one of: a copy inhibition prohibiting copying of said first digital information; a limited copy permission authorizing a predetermined number of times of copying of said first digital information; and an unlimited copy permission authorizing unlimited copying of said first digital information.

5 Claims, 9 Drawing Sheets

U.S. PATENT DOCUMENTS

| | | | | |
|---|---|---|---|---|
| 5,757,910 A | * | 5/1998 | Rim | 380/23 |
| 5,933,498 A | * | 8/1999 | Schneck et al. | 705/54 |
| 5,991,500 A | * | 11/1999 | Kanota et al. | 386/94 |
| 6,005,940 A | * | 12/1999 | Kulinets | 705/51 |
| 6,034,832 A | * | 3/2000 | Ichimura | 360/60 |
| 6,034,931 A | * | 3/2000 | Miwa et al. | 369/47.12 |
| 6,081,785 A | * | 6/2000 | Oshima et al. | 705/1 |
| 6,128,605 A | * | 10/2000 | Saito et al. | 705/57 |
| 6,173,403 B1 | * | 1/2001 | DeMont | 713/185 |
| 6,314,409 B2 | * | 11/2001 | Schneck et al. | 705/54 |
| 6,347,846 B1 | * | 2/2002 | Nakamura | 380/203 |
| 6,463,153 B1 | * | 10/2002 | Sako et al. | 380/201 |
| 6,516,064 B1 | * | 2/2003 | Osawa et al. | 380/201 |
| 2002/0156737 A1 | * | 10/2002 | Kahn et al. | 705/51 |

* cited by examiner

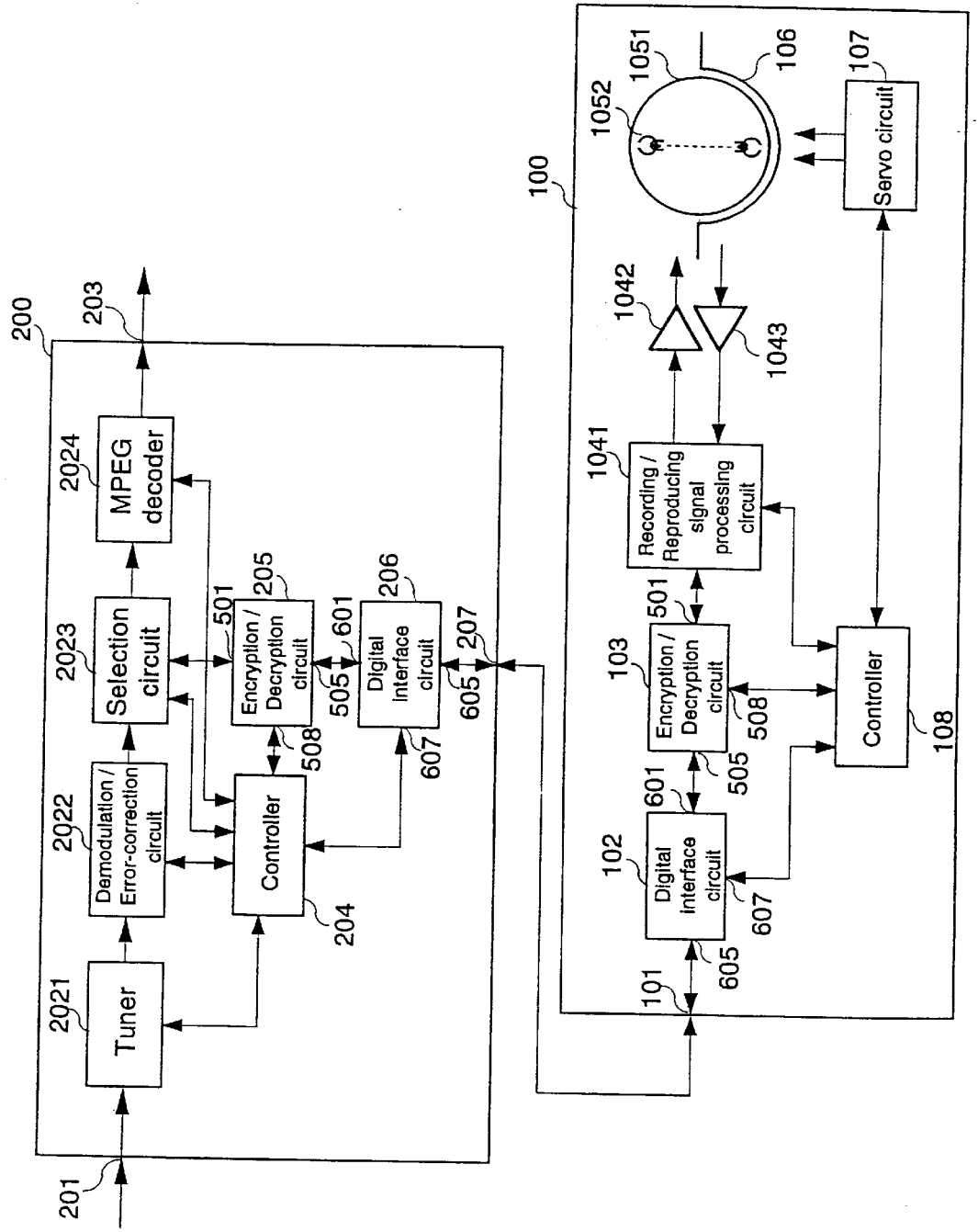

Fig.5A MPEG2 TS 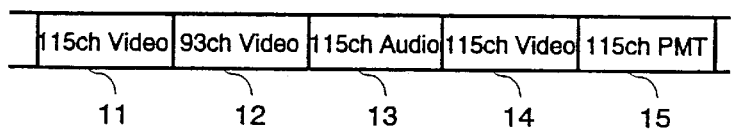
Fig.5B Output of the Selection circuit 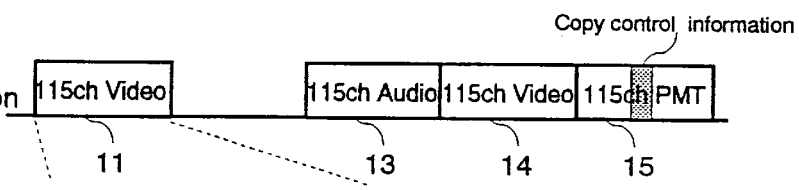
Fig.5C Packet 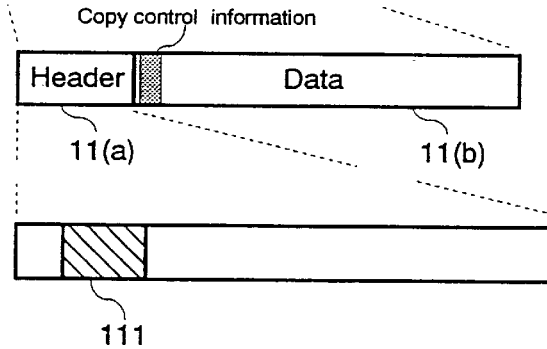
Fig.5D Header 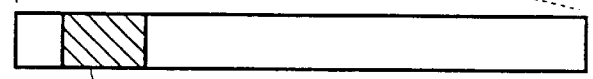

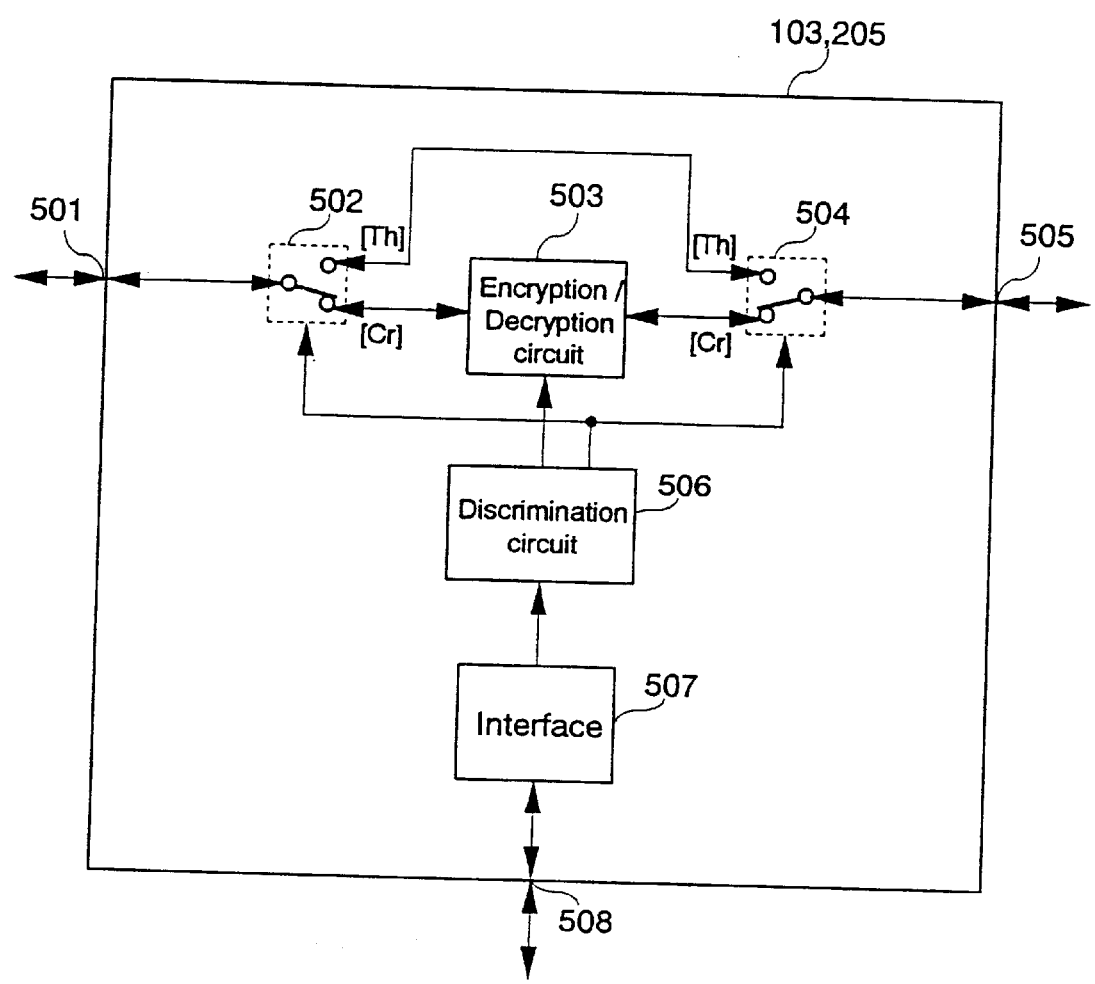

RECORDING APPARATUS FOR RECORDING DIGITAL INFORMATION

CROSS-REFERENCE TO RELATED APPLICATIONS

This application is a continuation of Ser. No. 09/201,757 filed 1 Dec. 1998, now U.S. Pat. No. 6,453,304 now allowed.

BACKGROUND OF THE INVENTION

This invention relates to an apparatus for protecting a copyright of digital information that is digitally transmitted between an information apparatus for home use and personal computers.

Recently, there have been significant advances in data compression for video and audio signals using digital technologies, so that an accumulation and/or transmission of data can be easily performed. Correspondingly, digitalization in the field of broadcasting has also advanced rapidly. For example, a broadcasting system in which an analog video and/or audio signals are digitally compressed and encoded with high efficiency, using an MPEG (Moving Picture Experts Group) standard, and are transmitted through a satellite and/or cable system has been developed. In general, a digital—broadcasting receiver called a set-top-box has been used for receiving and decoding a digital-broadcast signal.

Furthermore, a digital VCR (Video Cassette Recorder) that can record and reproduce video and audio information, such as a digital TV broadcast signal on magnetic type by employing a compression-encoding method has been developed as an apparatus for home use to record and/or reproduce video and audio signals.

One technology by which a requested program can be selected from received digital signals and in which plural information is multiplexed and transmitted is disclosed in the Japanese published unexamined patent application No. H8-56350. Moreover, a digital VCR that uses rotating magnetic heads is shown, for example, in the Japanese published unexamined patent application No. 5-174496. Furthermore, in the publication "Newly Developed D-VHS Digital Tape Recording System for the Multimedia Era" (IEEE Transactions on Consumer Electronics, Vol. 42, No. 3, August 1996, pp. 617–622), a digital broadcast recording system is disclosed in which a digital broadcast receiver and a digital VCR are connected with a transmission line, such as a digital interface. Japanese published unexamined patent application No. H2-7269 is technology describes a method for protecting a copyright of transmitted information in a case where a digital device is connected to a digital interface. In a case where copying of the digital content of an output from a digital interface is prohibited, the digital content is changed (scrambled) to different codes, and then the different codes are outputted on the digital interface. Therefore, the copyright of the digital contents are somewhat protected, because a digital recording apparatus, which receives the different codes doesn't have the ability to decode the different codes.

When a digital broadcasting signal is recorded and reproduced by using a digital VCR, etc., there is a first disadvantage in that, in transmitting copyrighted information externally between apparatuses through a digital interface, unauthorized interception of and/or tampering with the copyrighted information can occur, even if the copyrighted information is scrambled.

As one example, copyrighted information can be intercepted during transmission between apparatuses, and copy control information included therein can be modified (i.e., tampered with) so as to record the copyrighted information with unauthorized copy control information, e.g. allowing unlimited (i.e., piracy) copying. Accordingly, there is a problem that the pirated copyrighted information can be used again by transmitting the information to a device with a descramble function through another digital interface, even though further use should be prohibited. Accordingly, external transmission and recording of copyrighted information with prohibitive copy control information is disadvantageous in that it is susceptible to copyright piracy.

SUMMARY OF THE INVENTION

Accordingly, it is an object of the present invention to provide a digital information recording apparatus which is able to record digital information in such way as to protect the digital information, including copy control information, transmitted on a digital transmission line.

Further, it is an object of the present invention to protect a copyright of the digital contents on a digital interface.

In view of the foregoing objects of the invention for solving the problems explained above, a digital information recording apparatus to record digital information, comprises: separation means for separating first digital information and first copy control information from inputted digital information, including at least said first digital information and said first copy control information; decrypt means for decrypting said first digital information outputted from said separation means to produce decrypted second digital information; select means for selecting said first digital information or said decrypted second digital information from said decrypt means; recording means for recording the selected one of said first digital information or said decrypted second digital information; and control means for controlling at least said select means and said recording means in response to said first copy control information received from said separation means.

According to a preferred embodiment, a digital information recording apparatus to record digital information, comprises: separation means for separating first digital information and first copy control information from inputted digital information, including at least said first digital information and said first copy control information; process means for processing said first digital information outputted from said separation means and for outputting second digital information in response to control information; recording means for recording said second digital information; and control means for controlling at least said process means and said recording means in response to said first copy control information; wherein said control means controls said process means using said control information.

According to another embodiment, a digital information recording apparatus having a digital information output means, comprises: separation means for separating first digital information and first copy control information from digital information including at least said first digital information and first copy control information outputted from said digital information output means; decrypt means for decrypting said first digital information outputted from said separation means to produce decrypted second digital information; select means for selecting said first digital information or said decrypted second digital information outputted from said decrypt means; recording means for recording the selected one of said first digital information or said decrypted second digital information; and control means for controlling at least said select means and said recording means in response to said first copy control information received from said separation means.

BRIEF DESCRIPTION OF THE DRAWINGS

FIG. 4 is a block diagram of an embodiment of a transmitting and receiving system according to the present invention.

FIGS. 5A to 5D are diagrams of a packet multiplexing method according to the present invention.

FIG. 6 is a block diagram of one embodiment of the encryption/decryption circuit of the present invention.

DETAILED DESCRIPTION OF THE PREFERRED EMBODIMENTS

Figure 1:
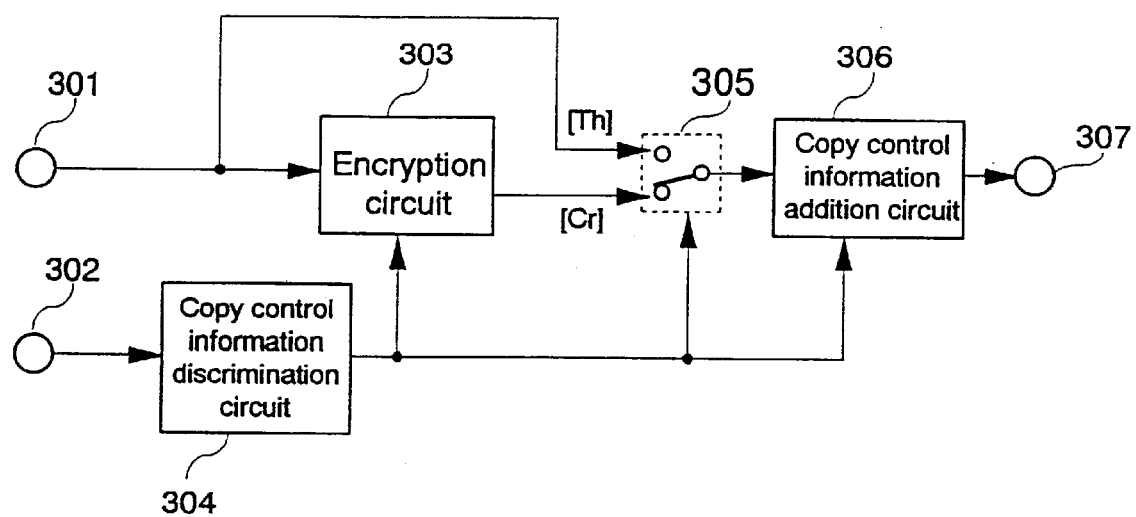
FIG. 1 is a block diagram of a digital signal transmission circuit according to the present invention.

Various embodiments of the present invention will be explained with reference to the drawings. FIG. 1 is a block diagram representation of a transmitting circuit according to the present invention. In FIG. 1, there is a digital signal input terminal 301, a copy control information input terminal 302, an encryption circuit 303, a copy control information discrimination circuit 304, a selection circuit 305, a copy control information addition circuit 306 and an output terminal 307, respectively.

A digital signal inputted from the input terminal 301 is supplied to the encryption circuit 303 and to one input of the selection circuit 305. A copy control information signal, which relates to the digital signal from the input terminal 301, is inputted to the input terminal 302. The copy control information, for example, in the form of 2-bit (or greater bit) digital data, indicates one of a prohibition against copying, a limited permission to allow copying a predetermined number of times (e.g., once) and no-limitation so as to allow unlimited copying of the digital signal, e.g., with copy control data (1, 1), (1, 0) and (0, 0), respectively.

The copy control information discrimination circuit 304 performs a discrimination procedure based on the copy control information received from the input terminal 302, and, if the copy control information is discriminated as (1, 1) or (1, 0) which denotes a prohibition or a limited permission, while the encryption circuit 303 is controlled to operate actively, the selection circuit 305 is switched to a terminal Cr so as to cause encrypted information to pass therethrough. And, if the copy control information is discriminated as (0, 0), which denotes no-limitation for copying, while the encryption circuit 303 is controlled to operate inertly, the selection circuit 305 is switched to a terminal Th.

The encryption circuit 303 encrypts the inputted digital signal with a predetermined encryption key which typically may be renewed minute by minute, and outputs the encrypted digital signal. To prevent an error in the propagation of the signal which influences the following data even if some errors like a bit-error are caused during transmission, for example, in the encryption circuit 303 a block encryption algorithm is employed by which a block unit, consisting of a plural number of bits, is used so that the encryption processing is realized with a simplified circuit.

Figure 2:
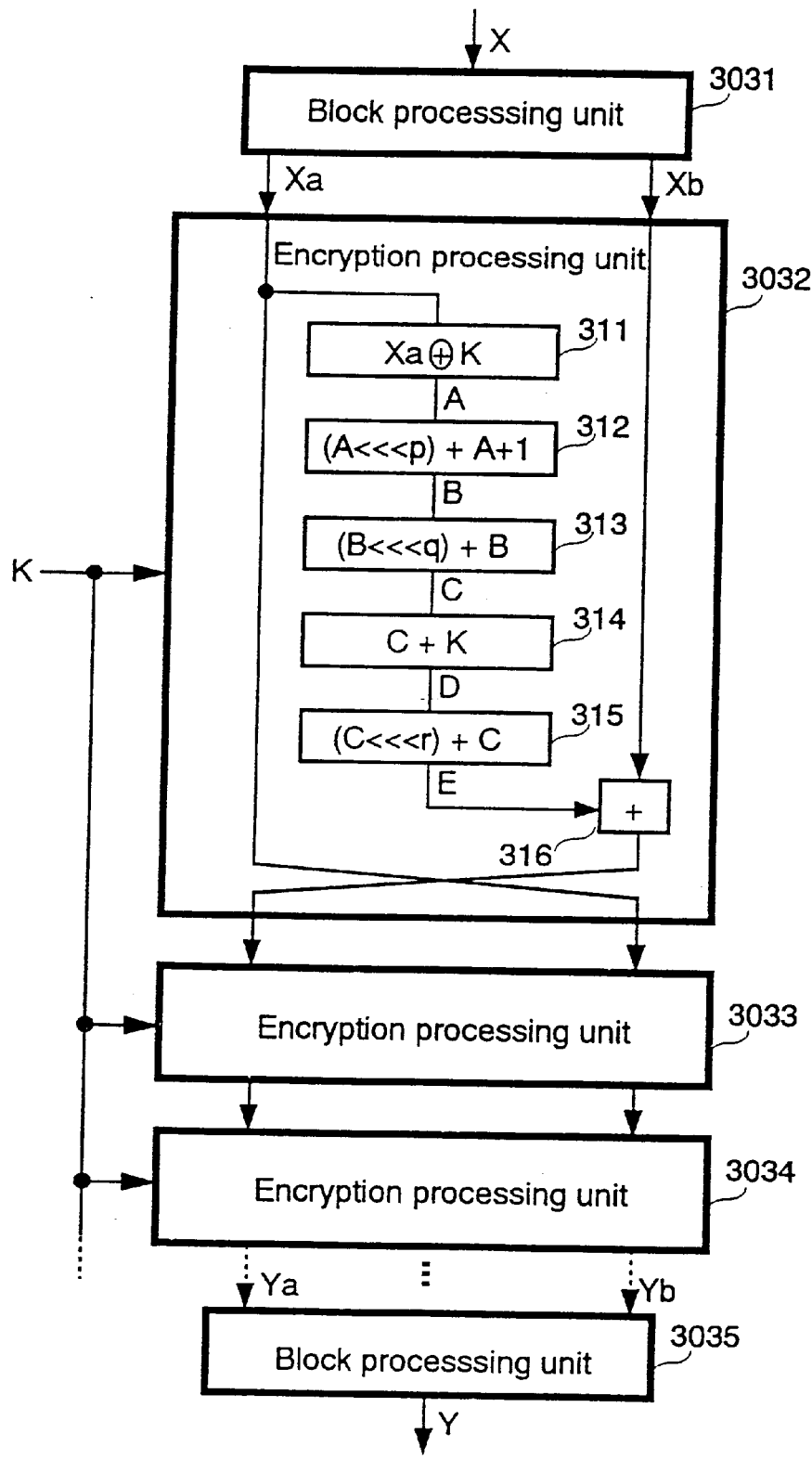
FIG. 2 is a block diagram of one embodiment of an encryption circuit according to the present invention.

One embodiment the encryption circuit 303 is shown in FIG. 2. In FIG. 2, 3031 and 3035 denote a block processing unit respectively, 3032, 3033, and 3034 denote an encryption processing unit, respectively, in which Xa and Xb represent upper-significant and lower-significant bits of an input block of data X, respectively, Ya and Yb represent encrypted data, respectively, and K represents an encryption key. As shown in FIG. 2, the input data block X is converted to sub-blocks consisting of a plural number of bits in the block processing unit 3031. For example, one block is composed of 64 bits in which the sub-blocks Xa and Xb are outputted as the 32 upper-significant bits and the 32 lower-significant bits of the block, respectively. In the encryption processing unit 3032, the inputted data sub-blocks Xa and Xb are processed by an exclusive or processing 311, by bit-shift and bit-add processings 312, 313 and 315, in which symbol A<<<p means that A is cyclically bit-shifted to the left by a number p bits, and by bit-add processings 314 and 316. Processing results therefrom are then inputted to the following encryption processing units 3033 and 3034, and furthermore their outputs are inputted for processing by other encryption processing units which are not shown in FIG. 2. As a result, the encrypted data Ya and Yb can be obtained from the processing units with repeated encryption processings in a plural number of steps.

In the block processing unit 3035, a block sequence of the data Ya and Yb is converted to become the same as the original bit sequence, and the encrypted data Y is outputted from the block processing unit 3035. Moreover, although not illustrated, the above-mentioned processings can be suspended and consumption of electric power caused by the processings can be reduced in response to an external signal, by stopping supply of a clock signal used as a standard for processings, such as an add processing, or by setting to a hold-mode an enable signal which selects whether to latch or hold data inputted to a register for holding a processing result.

In FIG. 1, the copy control information addition circuit 306 adds the copy control information inputted from the input terminal 302 to the output data received via the selection circuit 305. This can be realized, for example, by adding and storing the copy control information in the header of the output data. After these processings, the output data is outputted from the output terminal 307.

With the above-mentioned encrypting operations, unless decryption processing is performed to reverse the encryption, any work can be protected from unauthorized use by an intercepting party and/or from tampering, since the digital signal regarding such copyrighted work can be encrypted. In addition, since encryption processing is not performed when the copy control information indicates that unlimited copying of the work is permitted, the work can be used freely in such case.

In addition, in this embodiment, although switching is performed outside of the encryption circuit 303 to select whether or not the encryption processing is to be performed for the digital signal, switching and the same processing may be performed in the encryption circuit 303.

Figure 3:
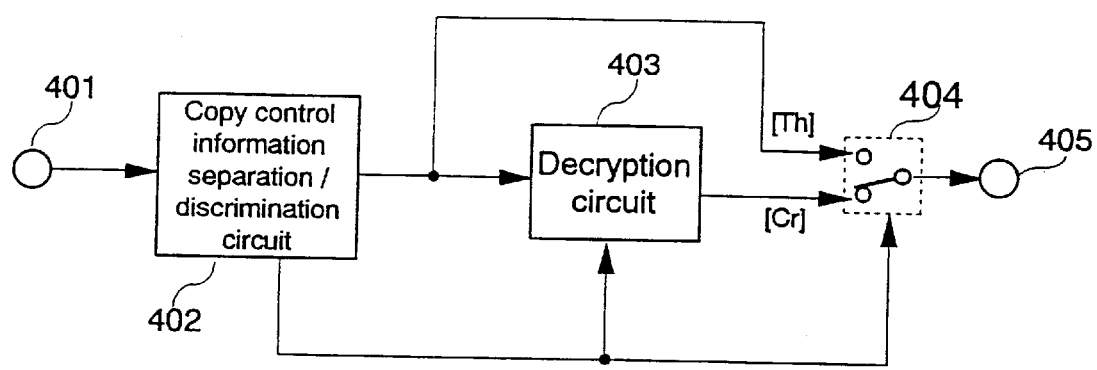
FIG. 3 is a block diagram of a digital signal receiving circuit according to the present invention.

FIG. 3 is a block diagram of another embodiment of the present invention. This embodiment corresponds to a digital information receiving apparatus as opposed to the transmitting apparatus shown in FIG. 1. In FIG. 3, there is a digital signal input terminal 401, a copy control information separation discrimination circuit 402, a decryption circuit 403, a selection circuit 404 and an output terminal 405.

In the copy control information separation discrimination circuit 402, from the digital signal received from the input terminal 401, the copy control information added to the digital signal by the apparatus of FIG. 1 is separated and the remaining digital signal is outputted to the decryption circuit 403. A discrimination procedure is performed based on the separated copy control information. If the copy control information is discriminated as being (1, 1) or (1, 0), which denotes a prohibition or a limited permission, respectively, the decryption circuit 403 is controlled to actively decrypt the digital signal, and the selection circuit 404 is switched to a terminal Cr. If the copy control information is detected as being (0, 0), which permits an unlimited copying, the decryption circuit 403 is inhibited, and the selector 404 is switched to the terminal Th.

The decryption circuit 403 decrypts the inputted digital signal with a predetermined decryption key which is the same as the encryption key added by the encryption circuit 303 of the apparatus shown in FIG. 1, and outputs the decrypted digital signal. For a decryption method, for example, an algorithm can be used by which some processings such as a bit shift processing and a bit substitution processing, are repeatedly performed i.e., with a reverse decryption processing corresponding to the encryption processing of the apparatus shown in FIG. 1.

As a result of the above-mentioned procedures, the digital signal whose copyright has to be protected can be subjected to decryption by authorized persons and outputted, and if the copy control information indicates permission for copying, the digital signal can be outputted with no decryption. When the output terminal 307 in FIG. 1 and the input terminal 401 in FIG. 3 are connected using a digital bus, since the digital signal whose copyright has to be protected is encrypted and transmitted via the bus, the copyright of the work can be protected from unauthorized actions, such as unlawful interception and tampering.

FIG. 4 is a block diagram of a transmission reception system representing an exemplary embodiment of the present invention. A digital signal, for example, is processed using the MPEG2 international standard in this embodiment. In FIG. 4, there is a recording and reproducing unit 100, a digital broadcasting signal receiving unit 200, an input and output terminal 101 for a signal, such as a digital broadcast signal, a digital interface circuit 102, a encryption and decryption circuit 103, a recording and reproducing signal processing circuit 1041, a recording amplifier 1042, a reproducing amplifier 1043, a rotary drum 1051, magnetic heads 1052, a magnetic tape 106, a servo control circuit 107, and a controller 108. Furthermore, FIG. 4 shows an input terminal 201 which inputs a digital broadcast signal, a tuner 2021, a demodulation and error-correction circuit 2022, a selection circuit 2023, a MPEG decoder 2024, a video and audio signal output terminal 203, a controller 204, an encryption and decryption circuit 205, a digital interface circuit 206 and an input and output terminal 207 for a signal, such as a digital broadcast signal.

The digital broadcast signal sent by a broadcasting station is inputted to the digital broadcast signal receiving unit 200 from the input terminal 201. The digital broadcast signal, for example, is sent through a digital broadcasting satellite, by terrestial broadcasting or by cable broadcasting or any other suitable arrangement. Here it is presupposed that a video signal and audio signal are compressed in a packet form using the MPEG system by a broadcasting station.

FIG. 5A, FIG. 5B, FIG. 5C and FIG. 5D illustrate one embodiment of the packet form of a video and audio signal. The inputted broadcast signal can be received by the tuner 2021 and detected at a point of predetermined broadcasting frequency by the controller 204. The detected signal, which is modulated, for example, by using a known modulation system, such as quadrature phase shift keying (QPSK), can be demodulated and subjected to an error correcting procedure in the demodulation and error-correction circuit 2022. As shown in FIG. 5A, the digital signal obtained by the demodulation and error-correction circuit 2022 is in the form of a multiplexed signal in which signals, such as a plural number of channels of compressed video and audio signals, are multiplexed in the packet format, so as to form a Transport Stream (TS). The size of a packet, for example, can be specified to be 188 bytes in the case of the MPEG2 standard.

As shown in FIG. 5B, the selection circuit 2023 selects and takes out only the packets required to decode the video and audio signal, whose channel is specified by the controller 204, from the TS demodulated by the demodulation and error-correction circuit 2022.

The procedure carried out in the selection circuit 2023 is as follows. At first, a user specifies a logical channel of a desired audio-visual program. Here the term logical channel refers to a collection of video and audio information constituting one program, and can, for example, correspond to a television channel used by an analog television broadcasting system. Moreover, in general, a frequency band in which a plural number of programs are multiplexed is called a logical channel in the digital broadcasting system.

Next, a program association table PAT, which is contained in the present received TS, is received. The PAT represents a table in program specific information PSI, specified by the MPEG2 standard. A packet identification PID, which indicates an identification number of a packet in which a specified logical channel of video and audio information is contained, is described in a program map table PMT. The PMT is also a table of the PSI. Described in the PMT are: the PID of the packet, such as a video and audio signal, which constitutes each logical channel included in the received TS, and a program clock reference PCR that indicates the time information timed by a reference clock signal used at the time of the compression of the video and audio signal. Moreover, the copy control information of each logical channel is stored in the PMT. If the PAT is obtained, the PID is taken out from the PAT, and the PMT including the PID is received. As shown in FIG. 5C, each packet of the TS is mainly constituted with a header 11(a) and data 11(b). As shown in FIG. 5D, the PID 111 which indicates an ID number of the packet is stored in the header 11(a). Copy control information can be included at any appropriate location within the transmitted/received information e.g., copy control information can be included within a separate packet (shown in dotted form in FIG. 5B) of the transport stream, or it may be included within a data or header portion (again shown in dotted form) in some or all of the program data packets as shown in FIG. 5C.

As mentioned above, in order to discriminate which information, such as video, audio and PCR information which constitute a logical channel, is stored in each packet, it is required to acquire the PID. The selection circuit 2023 supplies a packet-stream in which a video and audio signal are stored at the MPEG decoder 2024. The MPEG decoder 2024 expands the compressed video signal and audio signal and restores them. The restored video signal and audio signal are outputted from the output terminal 203. A user can view and listen to the information carried on these signals using a television monitor.

Hereafter, the process of recording information in the recording and reproducing unit 100 will be explained using FIG. 4, FIG. 6, FIG. 7 and FIG. 8. The selection circuit 2023 supplies a packet stream of a specified logical channel in which a video signal, audio signal, PSI, PCR and other signals are contained, to the digital interface circuit 206 through the encryption and decryption circuit 205. On the other side, the selection circuit 2023 transmits copy control information of the PMT packet of the channel to the encryption and decryption circuit 205 and the digital interface circuit 206 via the controller 204. The packet train, which is outputted from the selection circuit 2023 and is encrypted by the encryption and decryption circuit 205, is supplied to the encryption and decryption circuit 103 in the recording and reproducing circuit 100 through the output terminal 207 and input terminal 101, and the digital interface circuit 102.

FIG. 6 is a block diagram representation of one embodiment of the encryption and decryption circuits 205 and 103. The circuits include input and output terminals 501, 505 and 508, selection circuits 502 and 504, an encryption and decryption circuit 503, a discrimination circuit 506 for the copy control information, and an external interface circuit 507. In the encryption and decryption circuit 205, the copy control information provided from the controller 204 is sent to the copy control information discrimination circuit 506, via input and output terminal 508 and external interface circuit 507.

The discrimination circuit for copy control information 506 switches the encryption and decryption circuit 503 and selectors 502 and 504 according to the copy control information. For example, if the copy control information is "11" or "10", which means that copying is forbidden or is permitted only once, as a first example, selectors 502 and 504 are switched to the Cr side and the encryption and decryption circuit 503 is enabled for coding or decoding signals. And, if the copy control information is "00", which means that copies are permitted without any limitation, the encryption and decryption circuit 503 is inhibited, while switches 502 and 504 are turned to the Th side.

In the encryption and decryption circuit 205 shown in FIG. 6, a digital signal provided from the input and output terminal 501 is transmitted directly to the input and output terminal 505, or is transmitted to the input and output terminal 505 after being encoded in encryption and decryption circuit 503, depending on the copy control information received from the controller 108. On the other hand, in the encryption and decryption circuit 103 of the recording/reproducing equipment 200, a digital signal sent from input and output terminal 505 is transmitted to the input and output terminal 501 either directly or after being subjected to decoding in the encryption and decryption circuit 503, depending upon the copy control information received from the controller 108. A cipher key used for encryption and decryption is received from the interface circuit 507 in both cases.

Figure 7:
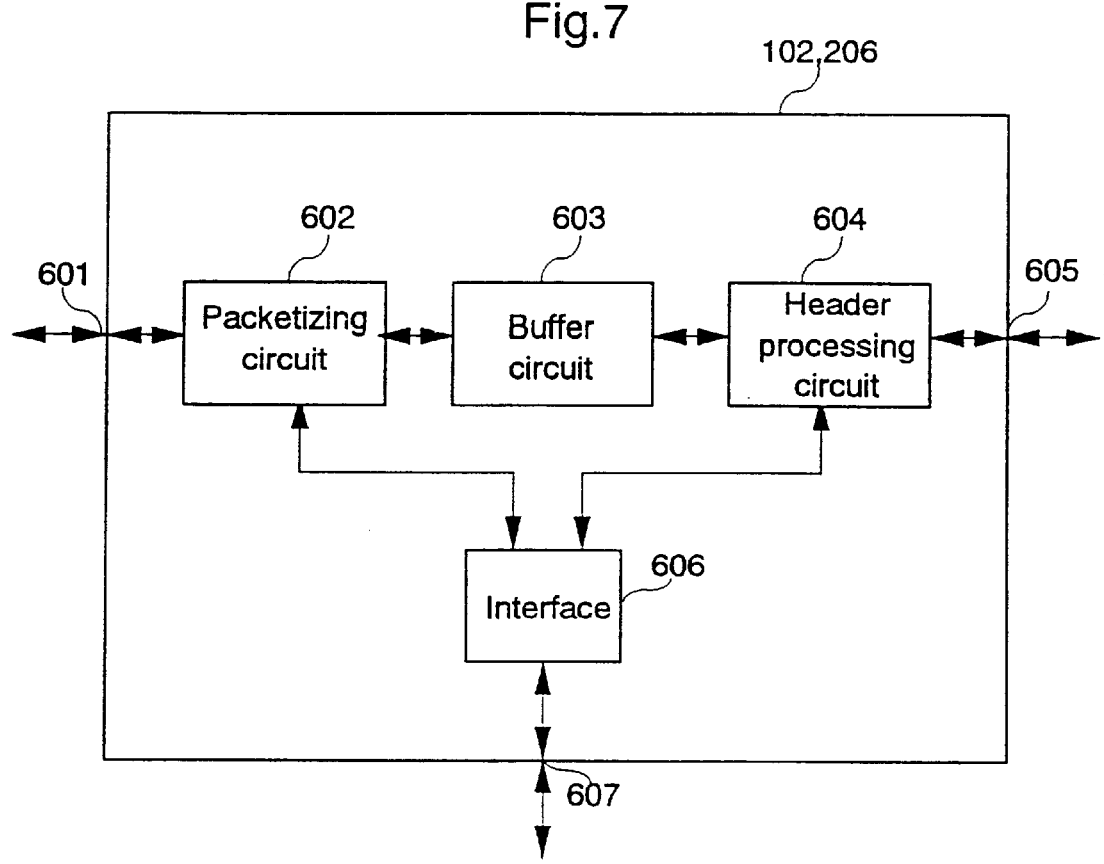
FIG. 7 is a block diagram of one embodiment of the digital interface circuit of the present invention.

The digital interface circuit 102 of the recording and reproducing unit 100 or the digital interface circuit 206 of the recording/reproducing device 200 is able to realize a protocol of a fast digital bus interface, such as IEEE 1394. It simultaneously has a function of transmitting a fast signal, while keeping the time interval of the transmitted packet stream constant. In FIG. 7, which shows details of the digital interface circuits 102, 206, there are input and output terminals 601, 605 and 607, a packetizing circuit 602, a buffer 603, a header processing circuit 604 and an external interface circuit 606. In this Figure, the encryption and decryption circuit is connected to the input and output terminal 601, and a digital bus interface is connected to the input and output terminal 605. In the digital interface circuit 206, a packet stream sent from the encryption and decryption circuit 205 is applied to the packetizing circuit 602 via input and output terminal 601, where information as to the arriving time of each packet at the packetizing circuit 602 is added to the header of each packet as a time stamp, which can be used to maintain the time interval of the packet stream.

The packet stream to which time stamps were added is stored in the buffer circuit 603. These packets are processed as bus-packets and are sent out on a digital bus interface. The header processing circuit 604 adds copy control information received from controller 204, an indication of the size of the packet, error correction symbols and other information to the packets, which are original packets received by the buffer 603 itself, an unified (i.e. combined) packet made up of some of the packets received by the buffer 603, or a partial divided packet derived from a received packet. After that, they are sent to the digital bus interface.

On the other hand, signal processing in the digital interface circuit 102 is performed as follows. Header processing circuit 604 reads out the copy control information of the packet received from the input and output terminal 605, which was added by the header processing circuit 604 in the digital interface circuit 206, and sends the information to controller 108 via external interface circuit 606. At the same time, the header processing circuit 604 reads out packet size information, error information and other information of the received packet and sends the same to the buffer circuit 603. Divided packets are constructed into their original form and are outputted from this block with a timing corresponding to the time stamps that are added at the top of each packet.

As shown in FIG. 4, a logical channel of the packet enciphered by the encryption and decryption circuit 205 of the receiver 200, after having been outputted from selector 2023, is outputted from the input and output terminal 207. The logical channel is supplied to the input and output terminal 101 of the recording/reproducing device 100 and is transmitted to the encryption and decryption circuit 103 via digital interface circuit 102, where it is decoded.

Figure 8:
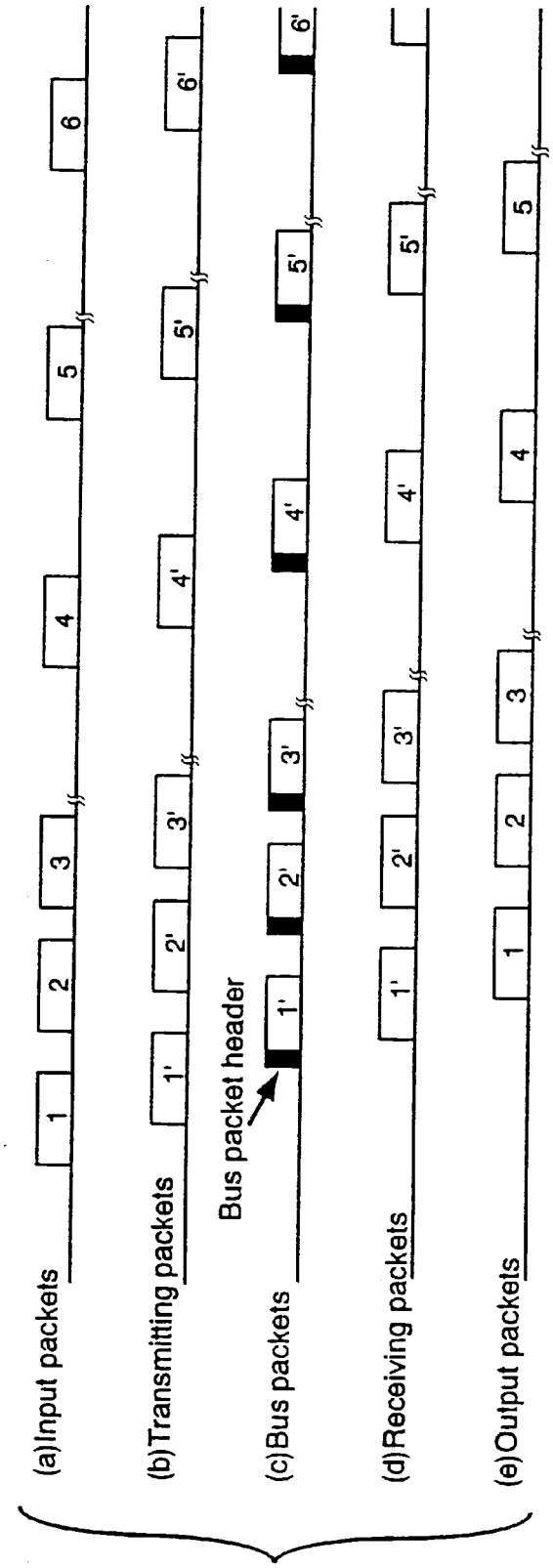
FIG. 8 is a timing diagram of the packet stream of the present invention.

FIG. 8 is a timing chart of the packet streams for each processing step, such as from input of packets to the encryption and decryption circuit 205, to the output of packets from the encryption and decryption circuit 103. The packet train supplied to the encryption and decryption circuit 205, as seen in line (a), is enciphered by the encryption and decryption circuit 206, as seen in line (b), and after that a header is added in the digital interface circuit 206 before sending the packets to the digital bus interface, as seen in line (c). The packet stream is accepted by the digital interface circuit 102, which then separates the headers there. The received packets are decoded at the encryption and decryption circuit 103 to the original packet stream. Naturally, if copying is allowable, no encipherment is carried out.

In FIG. 8, one logical packet stream is illustrated as an example, however, the present invention is not limited thereto. When a packet stream consisting of several channels is transmitted on the digital interface circuit, signal processing for each packet is carried out depending upon the copy control information of each packet.

Figure 9:
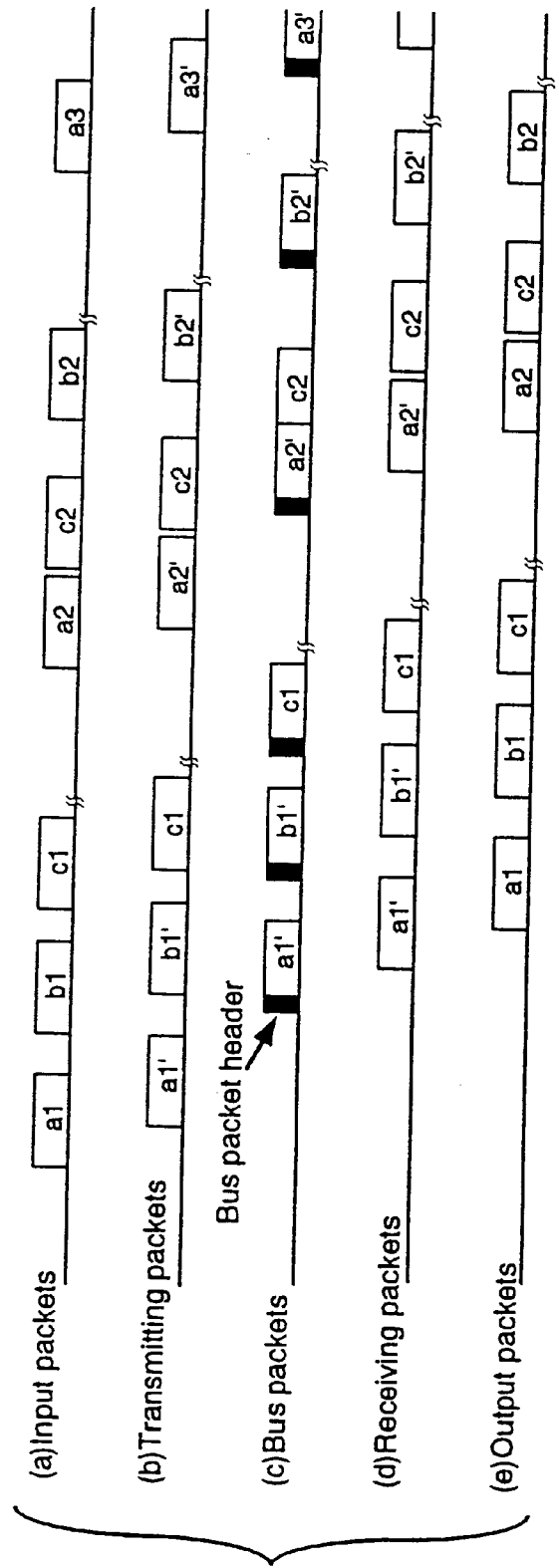
FIG. 9 is a timing diagram of the packet stream of the present invention.

FIG. 9 is a timing chart of a packet stream consisting of several channels. For example, if channel aCH has copy control information prohibiting copying, channel bCH has control information allowing a limited number of copies and channel cCH has control information allowing unlimited copying, in this case, encoding is performed for channels aCH and bCH, but channel cCH is transmitted without any encoding. Some extra delay is added to channel cCH to realize the same timing as channels aCH and bCH. Furthermore, when, for example, a packet of channel aCH and that of channel cCH are transmitted as a combined packet, the copy control information of each channel is stored in the same packet header. Even in such a case, an acceptor side decoding of channel aCH channel packet is prevented and no decoding is performed for the cCH channel packet after reading the information in the packet header.

Using this process, an acceptor side can read the channel cCH signal without a decoding circuit, but it can access channels aCH and/or bCH only after decoding them.

The signal processing performed by the recording/reproducing device 100 will be explained using FIG. 4. Encryption and decryption circuit 103 transmits a decoded packet train to the recording/reproducing signal processing circuit 1041, which adds copy control information received from controller 108, a proper control sign and an error collection signal and other information to it, and sends the result to recording amplifier 1042 as a recording signal. In this process, copy control information that is to be recorded, has been modified as follows; if "10", which means that only a single copying was permitted by the original control information, then the recording information is changed to "11", which subsequently prohibits copying; if the original control information is "00", the same "00" is recorded. When the copy control information is "11", then the recording itself is stopped.

Servo circuit 107 controls the rotary phase of rotating drum 1051, and signals are recorded on the proper recording tracks on magnetic tape 106 by the magnetic heads 1052 mounted on the rotating drum 1051. A program that a user selects can be recorded on the magnetic tape by using the above-mentioned processing. Because enciphered information is transmitted on the digital bus interface, an unauthorized interception and a falsification of the data can be prevented.

Next, a reproducing process will be explained. Servo circuit 107 controls the rotary phase of rotating drum 1051. Magnetic heads 1052 that scan the signal track of the magnetic tape 106 read out a reproduced signal, and this signal is transmitted to recording/reproducing signal processing circuit 1041 after being amplified by reproducing amplifier 1043. The recording/reproducing signal processing circuit 1041 performs error correction processing on the reproduced signal, and then recreates packets. In this process, the copy control information stored on the magnetic tape during the recording process is reproduced and transmitted to the controller.

The reproduced packet stream is encoded by encryption and decryption circuit 103, depending upon the copy control information, and is sent to the digital bus interface 102, after the copy control information is added thereto by the digital interface circuit 102. The digital interface circuit 206 separates the copy control information, while maintaining the time interval. Then, the packets are decoded in the circuit 205, depending upon the copy control information, and are transmitted to selector 2023 These signals can be used by the user as the received broadcast signal. With such an arrangement, a processed signal on the digital bus interface is encoded so as to be protected from unauthorized interception and falsification.

This example of the invention has been directed to a magnetic recording device with a helical scanning head as a recording/reproducing device. However, the invention is not restricted to such an arrangement, but can be applied to other devices, for example, those with an optical disk memory or a semiconductor memory. Furthermore, IEEE 1394 provides an example of a digital interface circuit, but the invention is not limited to this digital interface circuit, since other interface standards or arrangements are likewise applicable. In the described example of the invention, one tuner for digital broadcast is connected to one recording/reproducing device; however, this invention is not to be restricted to such a case, but can be applied to any other possible connection. For example, a connection between a tuner for digital broadcast and a computer, a connection between a computer and a recording/reproducing device, and a connection using a daisy chain between a digital tuner and several devices are possible.

As explained above, this invention makes it possible to protect the digital contents of proprietary data transmitted through a digital transmission line.

What is claimed is:

1. A digital information recording apparatus to record a digital information, comprising:

a digital interface circuit to separate first digital information and first copy control information from an inputted digital information signal including at least said first digital information and said first copy control information;

a decryptor to decrypt said first digital information outputted from said digital interface circuit to produce decrypted second digital information and to output said decrypted second digital information, or to output said first digital information without decrypting;

a recorder to record one of said first digital information and said decrypted second digital information received from said decryptor; and a controller to control said decryptor in response to said first copy control information received from said digital interface circuit;

wherein said controller controls said decryptor so as to select to output said first digital information in case that said first copy control information denotes an unlimited copy permission authorizing unlimited copying of said first digital information; and, said controller controls said decryptor so as to select to output said decrypted second digital information in case that said first copy control information denotes a limited copy permission authorizing a predetermined number of times of copying of said first digital information.

2. A digital information recording apparatus according to claim 1, wherein said first digital information is encrypted information in a case where said first copy control information denotes a copy inhibition or a limited copy permission, and said first digital information is non-encrypted information in a case where said first copy control information denotes an unlimited copy permission.

3. A digital information recording apparatus according to claim 1, further comprising:

a copy modifier adapted to modify said first copy control information into second copy control information in response to said first copy control information;

wherein said controller controls said recorder so as to record a selected one of said first digital information and said decrypted second digital information as well as said second copy control information.

4. A digital information recording apparatus according to claim 3, wherein said first copy control information denotes one of:

a copy inhibition inhibiting copying of said first digital information;

a limited copy permission authorizing a predetermined number of times of copying of said first digital information; and an unlimited copy permission authorizing unlimited copying of said first digital information.

5. A digital information recording apparatus according to claim 4, wherein said copy modifier, upon reaching said predetermined number of times of copying, modifies said limited copy permission authorizing a predetermined number of times of copying of said first digital information into said copy inhibition of said first digital information as said second copy control information in response to said first copy control information.

* * * * *